March 22, 1932. A. LEIB 1,850,080

RADIO GONIOMETRIC DIRECTION FINDING DEVICE FOR AIRPLANES

Filed July 2, 1926

INVENTOR.
AUGUST LEIB
BY Ira J. Adams
ATTORNEY

Patented Mar. 22, 1932

1,850,080

UNITED STATES PATENT OFFICE

AUGUST LEIB, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

RADIO GONIOMETRIC DIRECTION-FINDING DEVICE FOR AIRPLANES

Application filed July 2, 1926, Serial No. 120,220, and in Germany September 26, 1925.

The use of the magnetic compass in aerial navigation involves the disadvantage that it is very unsafe since the airplane when guided only by this means is unable to reach its goal whenever the view to earth is covered and a side wind is blowing.

The object of my invention is, therefore, to devise a radio goniometer means which, when used together with a magnetic compass, will guide the airplane pilot so that he may keep to the predetermined course and arrive at the desired station in the shortest possible path of flight.

While I have hereinafter described my invention as applicable to guiding airplanes, it should be understood that the same might equally well be used as a guiding means for ships entering a harbor during a storm and heavy fog when they would be apt to run slightly off their course and possibly run aground due to a narrow channel in the harbor.

Other objects of my invention are to produce a control and guiding means which is relatively simple, efficient and involves only a moderate expenditure of time and capital to install.

Still other objects will be apparent when the following description and claims are read in connection with the accompanying drawings; wherein, Fig. 1 shows diagrammatically the path of a plane using only a magnetic compass in flying from A to B;

Figure 1:
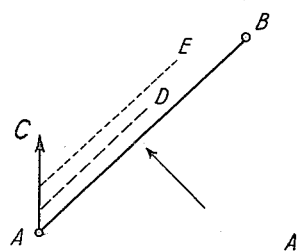

First referring to Fig. 1, if the airplane is to fly from point A, to point B, then, to preserve the direction of flight, the angle between the direction of flight AB and northern direction AC is decisive as to the direction of course to pursue. If the airlane is caused to drift sidewise by winds in the direction of the arrow, it then flies along a path such as D or E, parallel to line AB, and at the same angle with reference to AC, and, therefore, cannot reach its goal B so long as it flies on either path D or E.

Figure 2:
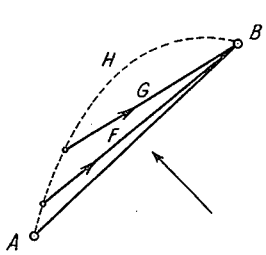
Fig. 2 shows a similar path where only a radio goniometer is used as a guide means.

Next referring to Fig. 2, if the airplane is guided only by a radio goniometer, the latter will always indicate to the pilot the direction towards the destination B. However, if the airplane is driven out of its course, it will successively fly along lines F, G etc. toward B, but it must eventually reach destination B under any conditions, since the radio goniometer works accurately up to the middle of antenna of the transmitter mounted at B. The disadvantage in this means is that the pilot is unable to keep on the shortest line of flight, and moreover, he is bound to follow some roundabout curved path such as indicated by the path H.

Figure 3:
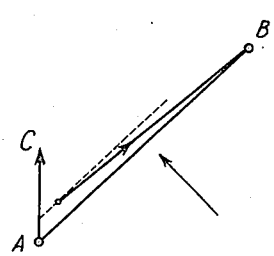
Fig. 3 shows the path where the means shown in Figs. 1 and 2 are combined.

It is only when the airplane is guided by the aid of both means of Figs. 1 and 2, i. e., compass and radio goniometer, that the pilot will be enabled to keep on the shortest line of flight as shown by Fig. 3. If he is guided by the course indicated by the compass, then, by hearing the goniometer signal in the telephone, the radio goniometer notifies him whenever he is drifting off his course; hence, he can correct his line of flight to the shortest route where no goniometer signal is perceived, due to the fact that there is no rate of change in the signal intensity received by the loop.

There are certain difficulties in carrying this navigation scheme into practice on the airplane. Apart from this task of piloting the airplane and observing the compass, the pilot cannot be expected in addition to attend to the radio goniometer. However, in large airplanes there is a chance for providing a separate man for the radio goniometer charged with the task of determining the direction of the sender and of imparting his findings to the pilot, but it is found very hard to establish sufficiently good communication by word of mouth between the two on a traveling airplane.

According to the present invention this difficulty is obviated by that the position of the goniometer loop or coil, or the goniometric findings, are imparted to the pilot from the goniometer observer preferably by transmission to optical means. This can be accomplished by the man watching the goniometer, who, by the aid of a suitable mechanical or electrical signal device, sets an indicator device inside the view of vision of the pilot in accordance with his goniometric findings. It should also be understood that such transmission could be effected automatically by a turning of the goniometer coil. A suitable scheme would be to turn the goniometer coil itself by entirely automatic means such as by means of a driving mechanism for the purpose of taking bearings, the important goniometer positions and bearings being then rendered perceivable to the pilot by the aid of synchronously working signalling devices, so that the operation of the goniometer by a separate observer on the airplane is not necessary.

Figure 4:
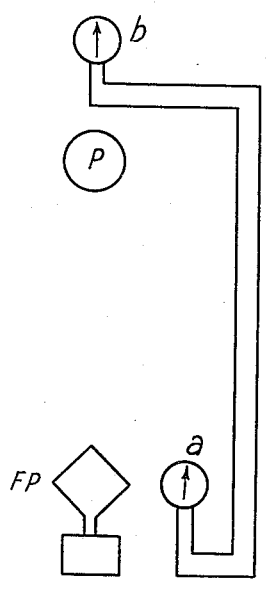
Fig. 4 shows diagrammatically one form to control the goniometric means where an observer accompanies the pilot.

Fig. 4 shows a diagrammatic view of a transmitting device between the radio goniometer and the pilot. The said remote-control indicator (tele-indicator) may be operated mechanically or electrically. P is the pilot's seat, FP the radio goniometer. $a$ is the transmitter and $b$ the receiver of the tele-indicator device. Both these devices are so constructed that only part of the scale, ahead and 45 degrees towards the right and the left-hand side, is visible. In the absence of goniometer signals, the hand is set by the man at the goniometer behind the covered scale. As soon as radio goniometer signals come in, the direction finder signals the position of the sender to the pilot. This arrangement offers the advantage that all intelligence transmission by word of mouth between pilot and direction finder is rendered unnecessary, and that the pilot, in observing the transmitter direction, is not distracted from his purely aeronautical duties as he is merely required to observe the indicating device in front of him.

Figure 5:
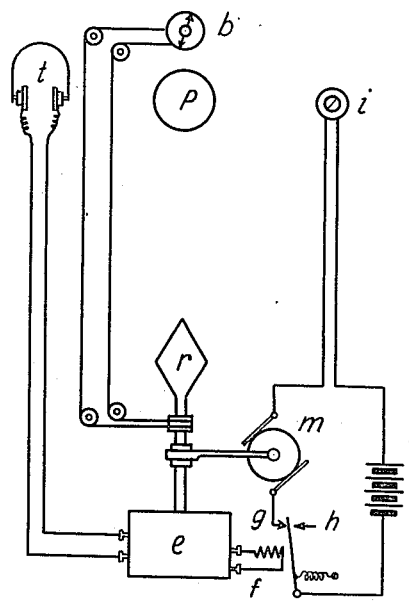
Fig. 5 shows diagrammatically a means similar to Fig. 4, but where the indicator operation is automatic and requires no observer.

A further development of the idea underlying the invention consists in directly coupling the tele-indicator device $b$ with the goniometer loop of the airplane so that in doing direction finding work, the pilot is signalled and notified whenever the loop is in the position where the signal strength is of minimum amount, or even might be arranged to operate with a maximum signal strength. On small-sized airplanes, it is often impossible to take along a special operator to take bearings, while, on the other hand, it may be impossible for the pilot to tend the goniometer, for the reason that these additional duties might distract him unduly from the duty of controlling the airplane. This difficulty is solved, according to another feature of this invention, by a goniometer device operating entirely by automatic means, as diagrammatically indicated in Fig. 5, where $r$ is the loop antenna of the goniometer arrangement, and $e$ is the goniometer receiver. The audible goniometer signals are transmitted, on the one hand, from said receiver to the telephone $t$ in the pilot's cap, so that the pilot is always able to make sure that the wave of the radio gonimeter is adjusted to the right transmitting station, and one the other hand, the receiver $e$ actuates relay $f$ which is furnished with a working contact $g$ and a back contact $h$. As long as goniometer signals come in, contact $g$ is closed, while in the presence of the minimum signal, the relay is connected with contact $h$. The relay switches in a small motor $m$ which continuously turns the loop $r$ through the agency of a worm gear. The entire equipment is switched in by the pilot by means of switch $i$, which is preferably located so as to be within easy reach of his hand. Upon closing the switch I, the loop $r$ is turned until the loop has attained the position where the signal strength has the minimum value. At that instant, the relay separates the contact $g$, the motor $m$ comes to a stop, and the loop remains in the minimum-volume position. The position at all times is transferred from loop $r$ to the tele-indicator device $b$ located in front of the pilot, and the position is then at once rendered visible to him. The whole task of the pilot in connection with this arrangement consists in closing the switch $i$, to check up the signal in telephone set $t$ as coming from the transmission station, and to read the direction of the transmitter on the tele-indicator device $b$. This arrangement, therefore, makes it possible to mount the radio goniometer and direction finder on the smallest airplane as well as upon planes capable of carrying a special observer.

The arrangement herein shown might also be modified as to operate equally as efficiently at a position of maximum-volume for the antenna, and, therefore, the most favorable point, whether at a maximum or a minimum volume may be considered as the point of optimum rate of change of the signal intensity.

Having described my invention, I claim:

1. In an arrangement for aerial navigation, a frame aerial normally adapted to assume a position of zero response with reference to the signalling station to which it is tuned, a receiver associated therewith, an aerial indicator connected with said receiver, visual direction indicating means, a driving connection between said aerial and said visual indicator whereby said visual indicator assumes a position determined by the position of said aerial, a motor for rotating said aerial and said indicating means, an energizing circuit for said motor, a normally open contact in said energizing circuit and magnetic means connected with said receiver and responsive to signal energy in the latter when the aerial deviates from position of zero response to close said energizing circuit.

2. In radio apparatus, a rotatable directional aerial, a visual direction indicator connected through driving means to said aerial whereby said indicator is rotated by rotation of said aerial, a rectifier connected with said aerial, receiving means connected with said rectifier, a motor, a driving connection between said motor and said aerial, an energizing circuit for said motor, a normally open contact in said circuit, and means connected with said rectifier, for closing said contact, when current of a predetermined amplitude flows in said aerial.

AUGUST LEIB.